United States Patent
Lenard et al.

(10) Patent No.: US 7,140,948 B2
(45) Date of Patent: Nov. 28, 2006

(54) MACHINE FOR MACHINING ELONGATE WORKPIECES PROVIDED WITH CUTTING TEETH, IN PARTICULAR FOR GRINDING BANDSAW BLADES

(75) Inventors: Peter Lenard, Biberach (DE); Fritz Riehlein, Schemmerhofen-Albenweiler (DE); Norbert Bailer, Schemmerhofen-Altheim (DE)

(73) Assignee: Vollmer Werke Maschinenfabrik GmbH, Biberach (DE)

( * ) Notice: Subject to any disclaimer, the term of this patent is extended or adjusted under 35 U.S.C. 154(b) by 96 days.

(21) Appl. No.: 11/033,792

(22) Filed: Jan. 12, 2005

(65) Prior Publication Data

US 2006/0057941 A1   Mar. 16, 2006

(51) Int. Cl.
*B24B 49/00* (2006.01)
(52) U.S. Cl. .................. 451/11; 451/182; 451/184; 451/185; 451/234
(58) Field of Classification Search .................. 451/9, 451/10, 11, 182, 184, 185, 224, 229, 234, 451/336, 413, 907; 76/43, 45, 75, 77
See application file for complete search history.

(56) References Cited

U.S. PATENT DOCUMENTS

| | | | | |
|---|---|---|---|---|
| 4,815,239 A | * | 3/1989 | Sommer | 451/5 |
| 5,048,236 A | * | 9/1991 | Williams | 451/11 |
| 5,402,607 A | * | 4/1995 | Lombard | 451/5 |
| 6,224,462 B1 | * | 5/2001 | Yokoyama et al. | 451/10 |
| 6,374,703 B1 | * | 4/2002 | Schurb et al. | 76/40 |
| 6,379,218 B1 | * | 4/2002 | Bailer et al. | 451/8 |
| 6,631,658 B1 | * | 10/2003 | Brown | 76/37 |
| 6,685,544 B1 | * | 2/2004 | Dieck et al. | 451/141 |
| 2005/0159079 A1 | * | 7/2005 | Astigarraga Castanares et al. | 451/5 |
| 2005/0260926 A1 | * | 11/2005 | Junker | 451/11 |

FOREIGN PATENT DOCUMENTS

DE    1 750 660    4/1971
WO    WO/9219408    11/1992

* cited by examiner

*Primary Examiner*—Eileen P. Morgan
(74) *Attorney, Agent, or Firm*—Woodard, Emhardt, Moriart McNett & Henry LLP

(57) ABSTRACT

A machine for machining bandsaw blades. A machining device, a feed device, a workpiece-fixing device and a workpiece guiding device are mounted to a common central machine block. The machining device has a rotatably driven positionable adjustable grinding wheel with the workpiece-guiding device supporting the bandsaw blade and the workpiece-fixing device clamping the blade in position.

10 Claims, 4 Drawing Sheets

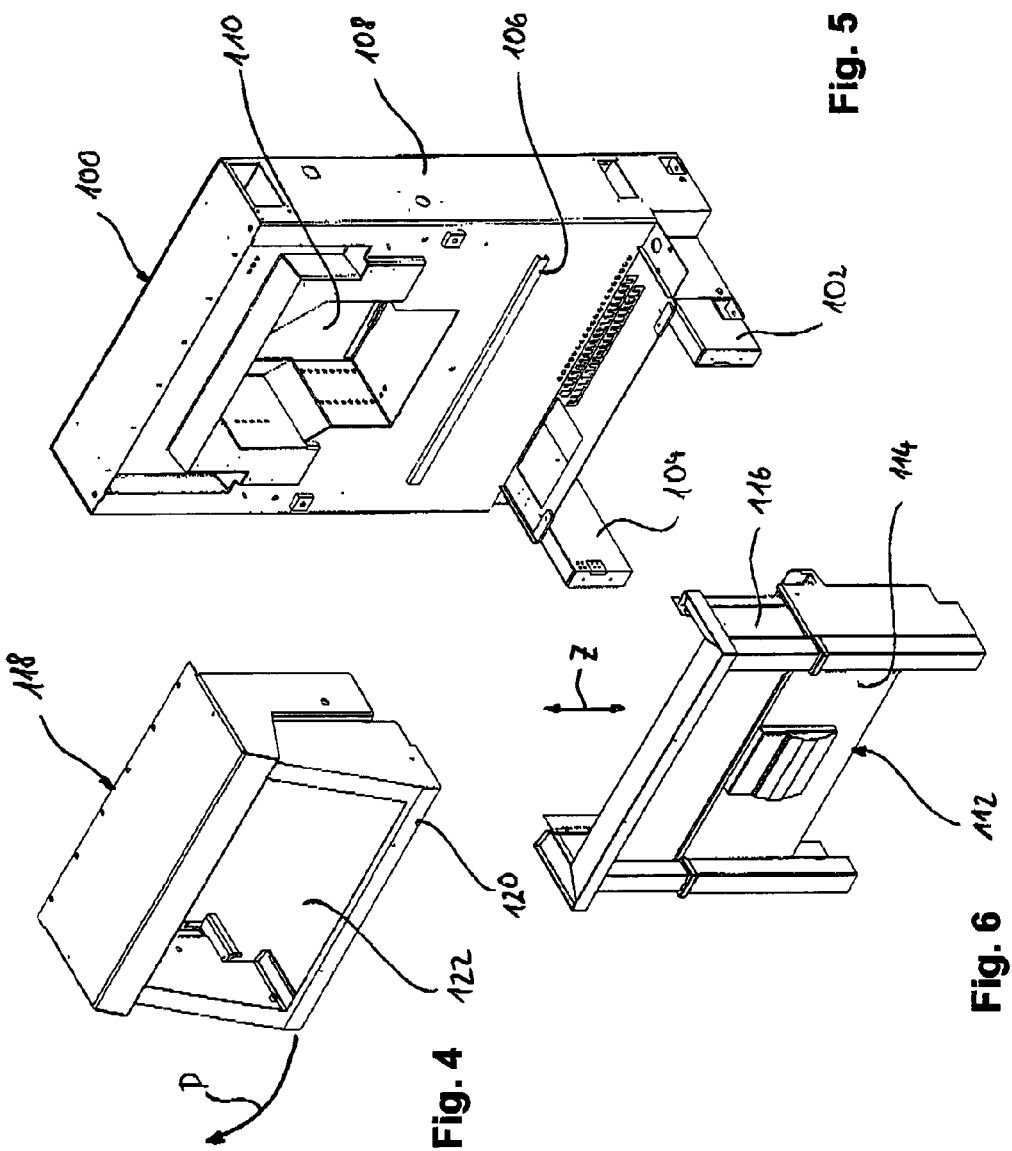

MACHINE FOR MACHINING ELONGATE WORKPIECES PROVIDED WITH CUTTING TEETH, IN PARTICULAR FOR GRINDING BANDSAW BLADES

The invention relates to a machine for machining elongate workpieces provided with cutting teeth, in particular for grinding bandsaw blades, comprising a machining device, a feed device, a workpiece-fixing device and a workpiece-guiding device, the machining device having a tool, in particular a grinding wheel, which is rotationally drivable via a tool spindle about a tool spindle axis, for machining the workpiece, the rotationally drivable tool being displaceable relative to the workpiece by means of a multiaxis arrangement with axis guide, furthermore the feed device being designed with a feed head, which is displaceable along a feed axis and by means of which the feed device positions the workpiece in a desired position relative to the machining device, furthermore the workpiece-guiding device guiding the workpiece along a predetermined guide path to bring about the desired position by means of the feed device, and the workpiece-fixing device fixing the workpiece on reaching the desired position.

A machine for grinding bandsaw blades is known, for example, from WO 92/19408. In this machine, it is necessary to position the various components, consisting of machining device, feed device, workpiece-fixing device and workpiece-guiding device, in such a way relative to one another that they enable reliable and dimensionally accurate machining of the workpiece. In particular, it is necessary to position dimensionally accurately the individual guides which have to ensure exact guidance of the elongate workpiece to bring about the desired position. For dimensionally accurate positioning of the individual components, elaborate measures have to be taken, since some of the individual components are attached to machine frame parts separated from one another. In particular, the assembly of the machine is very complex. Moreover, the adjustment of such a conventional machine is complex. Furthermore, even small dimensional inaccuracies of the machine housing lead to unsatisfactory results in the machining of the elongate workpieces, in particular because the guiding devices remote from the machining device become maladjusted relative to the machining device.

In contrast, an object of the present invention is to provide a machine of the type described at the outset which affords a high level of functional reliability and dimensional accuracy, while being of simple and compact construction.

This object is achieved by a machine of the type described at the outset which has a common central machine block, on which the machining device, the feed device, the workpiece-fixing device and the workpiece-guiding device are mounted.

The invention therefore provides for mounting the essential functional components of the machine in the manner of subassemblies on the central machine block and thus being able to adjust them relative to a common base. As a result, assembly of the entire machine is facilitated. And also adjustment is facilitated, since all the components of the machine are arranged comparatively compactly relative to one another. Furthermore, the actual machine functional unit which has the essential functional components of the machine can be preassembled and in this preassembled state undergo functional tests before the functional unit is inserted into a machine housing, which makes accessibility to the individual components more difficult. By mounting the individual components of the machine on the central machine block, dimensional inaccuracies of the machine stand or the machine housing have largely no effect on the result of a machining operation. The machine housing then has merely a protective function against external interference and release of emissions, and serves for safety purposes. The machine housing furthermore serves merely for accommodating electrical control components, coolant containers, secondary operating equipment, such as the centralised lubrication system and fire-extinguishing equipment, pneumatic or hydraulic supply equipment, such as oil tanks and maintenance equipment, or the like.

A development of the invention provides that the multiaxis arrangement of the machining device has an axis guide for moving the rotationally drivable tool, in particular a grinding wheel, along a travel axis substantially orthogonal to the longitudinal extent of the workpiece in the desired position. Furthermore, it may be provided according to the invention that the multiaxis arrangement of the machining device has a pivoting mechanism for pivoting the rotationally drivable tool, in particular the grinding wheel, about a pivot axis substantially orthogonal to the travel axis and to the longitudinal extent of the workpiece in the desired position. Such a configuration of the multiaxis arrangement allows different tooth geometries to be machined in a numerically controlled manner. Preferably, with regard to the pivot axis, it is provided that the latter runs through a geometrical point defined by the tooth tip of a cutting tooth, to be machined at the time, of the workpiece situated in the desired position. This geometrical point is fixedly predetermined for the machine. The machine is therefore set to this geometrical point and when receiving a new workpiece to be machined the individual components of the machine have to be set in such a manner that the tooth tip of the workpiece cutting tooth to be machined at the time coincides with the geometrical point.

A development of the invention provides that the workpiece-guiding device has carrying arms extending from the central machine block. As already indicated above, in particular the guiding means for guiding elongate workpieces in conventional machines are attached to the machine housing and are thus subject to dimensional inaccuracies and distortion effects of the machine housing. By attaching the carrying arms to the central machine block, these arms can be positioned and adjusted relative to the rest of the functional components, such as the machining device, feed device and workpiece-fixing device, via the common central machine block, so that dimensional inaccuracies of the machine housing or the machine stand have no effect on the workpiece-guiding device.

In a development of the invention, it is provided that the carrying arms are attached in a positionally variable manner to the central machine block via axis guides, the axis guides guiding the carrying arms each in a direction substantially orthogonal to the longitudinal extent of the workpiece in the desired position. This measure allows the machine to be set to different workpiece heights. Again taking the example of a bandsaw blade to be machined, the machine can be set to the particular blade width in question, and again in such a manner that the tip of the cutting tooth to be machined at the time coincides with the geometrical point. A development of the invention provides that there are attached to the carrying arms transverse carriers, which carry guide rests in the region of their free ends. The guide rests can have slide rails and guide rollers.

With regard to the central machine block, it can be provided that the latter is designed with two vertical supports, which are connected to one another via a transverse-bracing arrangement, the carrying arms being mounted on the vertical supports and the machining device, the feed device and the workpiece-fixing device being supported on the transverse-bracing arrangement. Such a construction of the central machine block guarantees a high level of dimensional accuracy and little distortion. Moreover, the individual components of the machine can thus be arranged compactly relative to one another and assembled in a simple manner.

For simple and cost-effective producibility, while nevertheless achieving a high level of dimensional accuracy, it can be provided that the central machine block is produced from a cast material, in particular from grey cast iron material or from mineral cast material.

The machine thus assembled can then, as already indicated above, be inserted into a machine housing, having a machine stand which receives the central machine block, a front guard which covers the machine stand, and a protective cover which allows access to the machining device. In this case, merely the machine stand has to be designed sufficiently massively to securely hold the unit consisting of the central machine block and machine components attached thereto. If desired, the machine stand can be provided with an opening to ensure access to the machining device and the other components attached to the machine block, from different sides. The protective cover can be provided with a viewing window and be opened and closed via a flap mechanism. The front guard can be provided with a fixed guard which is fixed relative to the machine stand and with a displaceable part to allow further access to the machine block and the components attached thereto.

The invention is described below with reference to the accompanying figures, in which:

FIG. 4 shows a protective cover of the machine housing;

FIG. 5 shows a machine stand, and

FIG. 6 shows the front guard of the machine housing.

Figure 1:
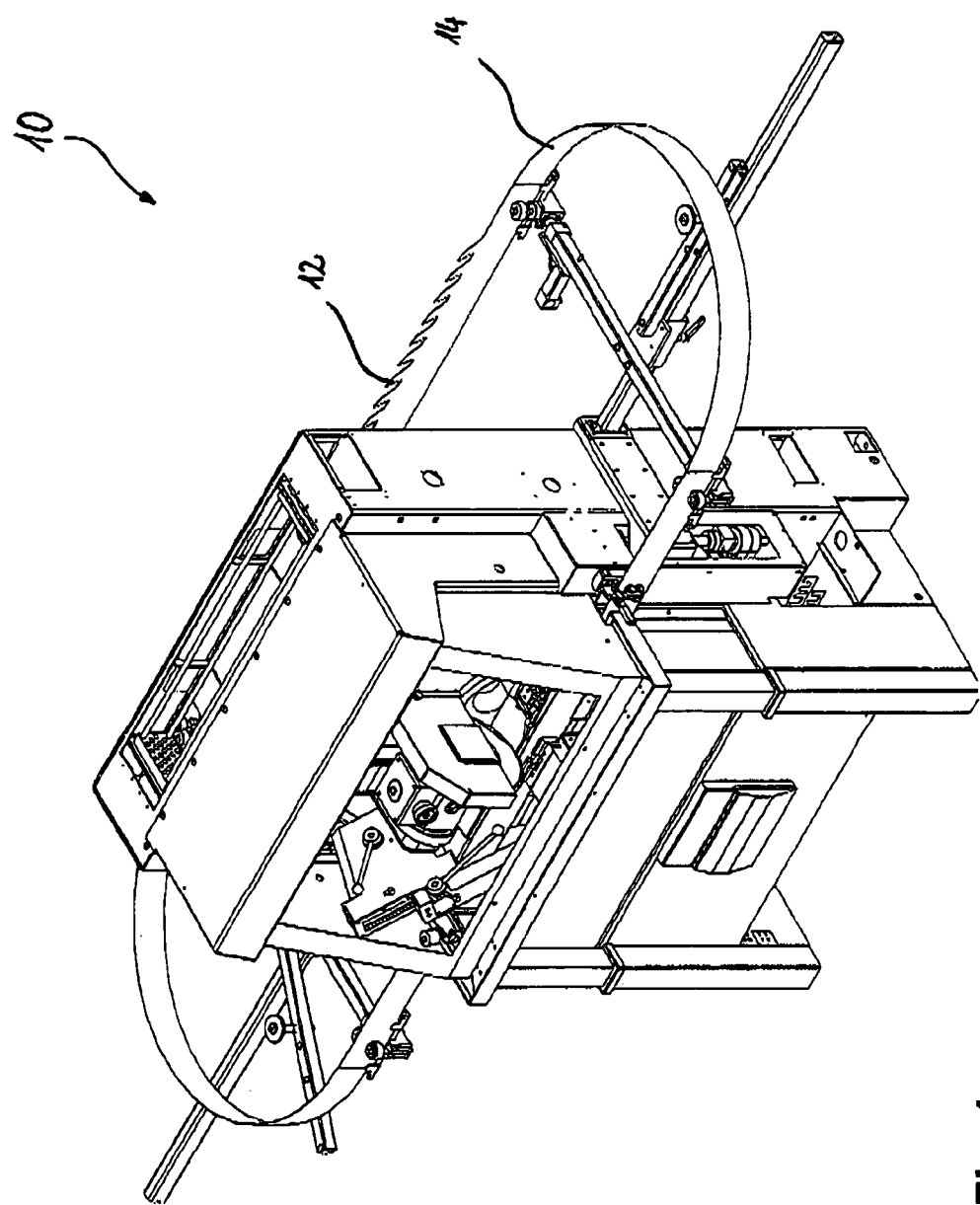
FIG. 1 shows a perspective view of the machine according to the invention.

In FIG. 1, a machine according to the invention is shown in perspective and denoted generally by 10. This machine serves for machining individual cutting teeth 12 of an endless bandsaw blade 14. To simplify the illustration, the endless bandsaw blade 14 is shown with saw teeth 12 only in a certain section. It should be pointed out, however, that it is provided with such cutting teeth 12 along its entire longitudinal extent. The bandsaw blade 14 extends in an oval shape and is machined in the region of its longitudinal sides in the machine 10.

Figure 2:
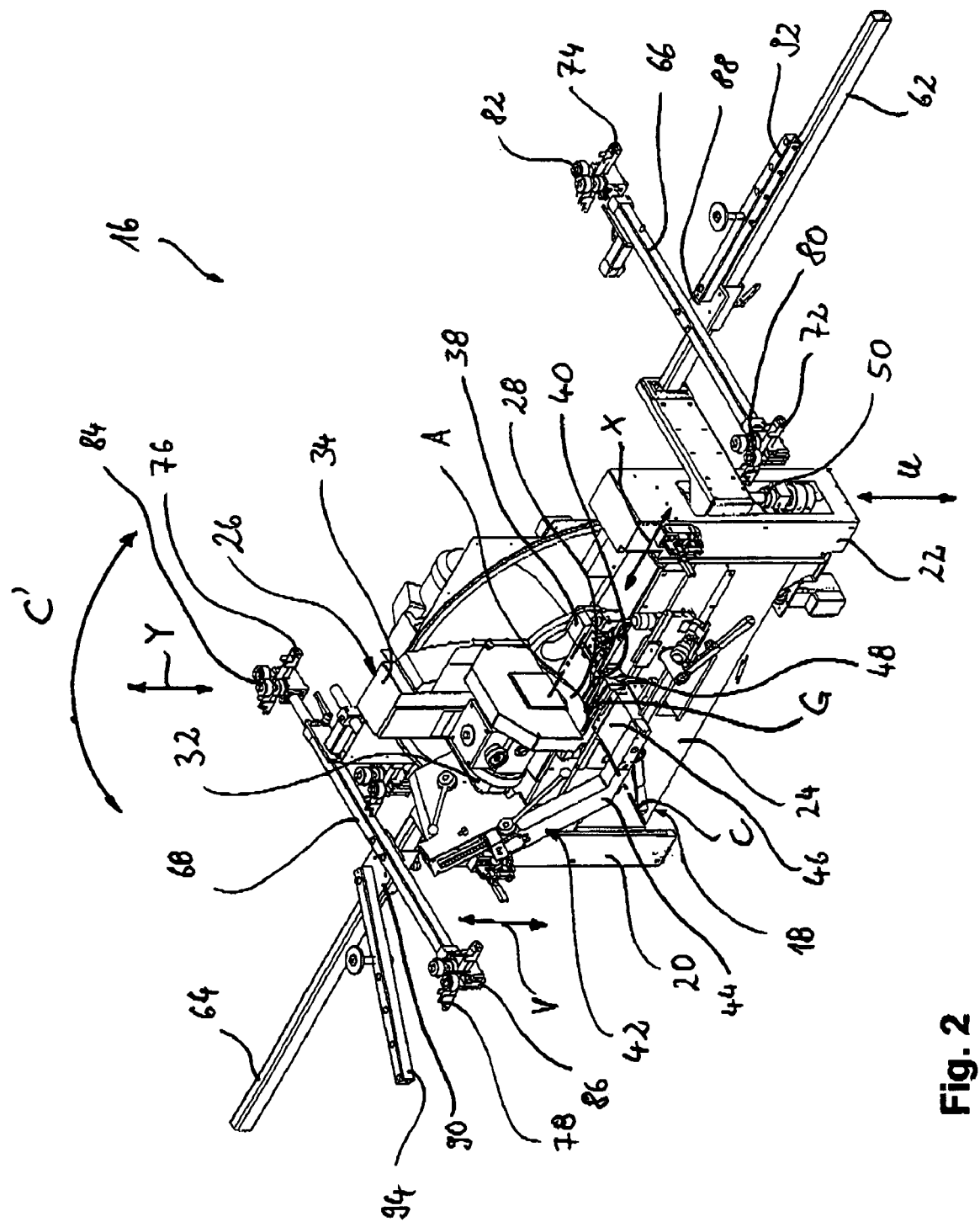
FIG. 2 shows a view of the machine corresponding to FIG. 1 without the housing.

With regard to the construction of the machine 10, reference will be made hereinbelow in particular to FIGS. 2 and 3. FIG. 2 shows a functional block 16 of the machine 10. This block comprises a central machine block 18, which is massively produced from grey cast iron material. The machine block 18 has two massive vertical supports, which are concealed by covering plates 20 and 22 and are rigidly connected to one another by means of a transverse-bracing arrangement 24. Various components of the functional unit 16 are attached to the machine block 18. Extending around the transverse-bracing arrangement 24 is a machining device 26. The latter comprises a grinding wheel 28 which is rotationally drivable about a tool spindle axis A. The drive takes place via a drive motor 30 shown in FIG. 3 and a transmission mechanism 32.

The grinding wheel 28 together with its drive 30 and 32 is displaceable along a travel axis Y via an axis guide 34. Furthermore, the arrangement is pivotable about a pivot axis C, which extends through a geometrical point fixed for the machine and denoted by G and runs substantially orthogonally to the tool spindle axis A and the travel axis Y. The pivotability of the grinding wheel together with its drive is shown, furthermore, by the pivot arc C'. It is realised via a pivot bearing 36.

Provided on the central machine block is, furthermore, a feed device 38 with a feed finger 40, by means of which the bandsaw blade 14 can be moved in the direction of its longitudinal extent. The feed device 38 can be displaced along a feed axis X in a manner oscillating to and fro and is driven via a drive motor 40 for realising this displacement. In the region of the feed device, the direction of the feed axis X is parallel to the direction of the longitudinal extent of the bandsaw blade 14.

Furthermore, a clamping device 42 with a clamping arm 44 is attached to the machine block 18. The clamping arm 44 is displaceable along the axis C and has a clamping jaw 46 at its free end. The clamping jaw 46 can be pressed against a counter clamping jaw 48 in a numerically controlled manner, the saw blade shown in FIG. 1 being fixed between clamping jaw and counter clamping jaw. As a result, a saw blade brought into a desired position by the feed device 38 can be fixed in this desired position. The desired position of the saw blade is defined by a tooth tip of a cutting tooth, to be machined at the time, coinciding with the aforementioned geometrical point G.

Attached to the two vertical supports of the machine block 18 which are concealed by the covering plates 20 and 22 are vertical axis guides 50 and 52. By means of these vertical axis guides, carrying arms 54 and 56 can be displaced along vertical axes U and V. FIG. 3 shows a drive device 58 and a corresponding drive transmission 60 for driving the two axis guides 50 and 52. Provided on the carrying arms are cantilevers 62 and 64, which have transverse carriers 66 and 68 displaceable along the longitudinal extent of the cantilevers 62 and 64 and fixable in any desired position thereon. The transverse carriers 66 and 68 are telescopic, as shown at 70 in the bottom right of FIG. 3. Moreover, at their free ends they have guide rails 72, 74, 76 and 78, on which, as shown in FIG. 1, the bandsaw blade 14 rests and is guided in the longitudinal extent. Provided on both sides of the guide rails 72, 74, 76 and 78 are guide roller pairs 80, 82, 84, 86. The guide roller pairs 80, 82, 84 and 86 each receive the saw blade 12, as shown in FIG. 1, between the rollers each forming a pair and guide this blade in a defined manner on the guide rails 72, 74, 76, 78.

Attached to a respective fixing slide 88 and 90, via which the transverse carriers 66 and 68 are each guided and fixable on the cantilevers 62 and 64 assigned to them, are, furthermore, pivotable supporting arms 92 and 94, which, likewise, as shown in FIG. 1, can support the curved sections of the endless saw blade 14. Optionally, guide rollers 96 and 98 can also be used as well for this purpose, and these rollers can be inserted into holes made previously along the supporting arms 92 and 94, as required, and rotatably fastened therein.

Figure 3:
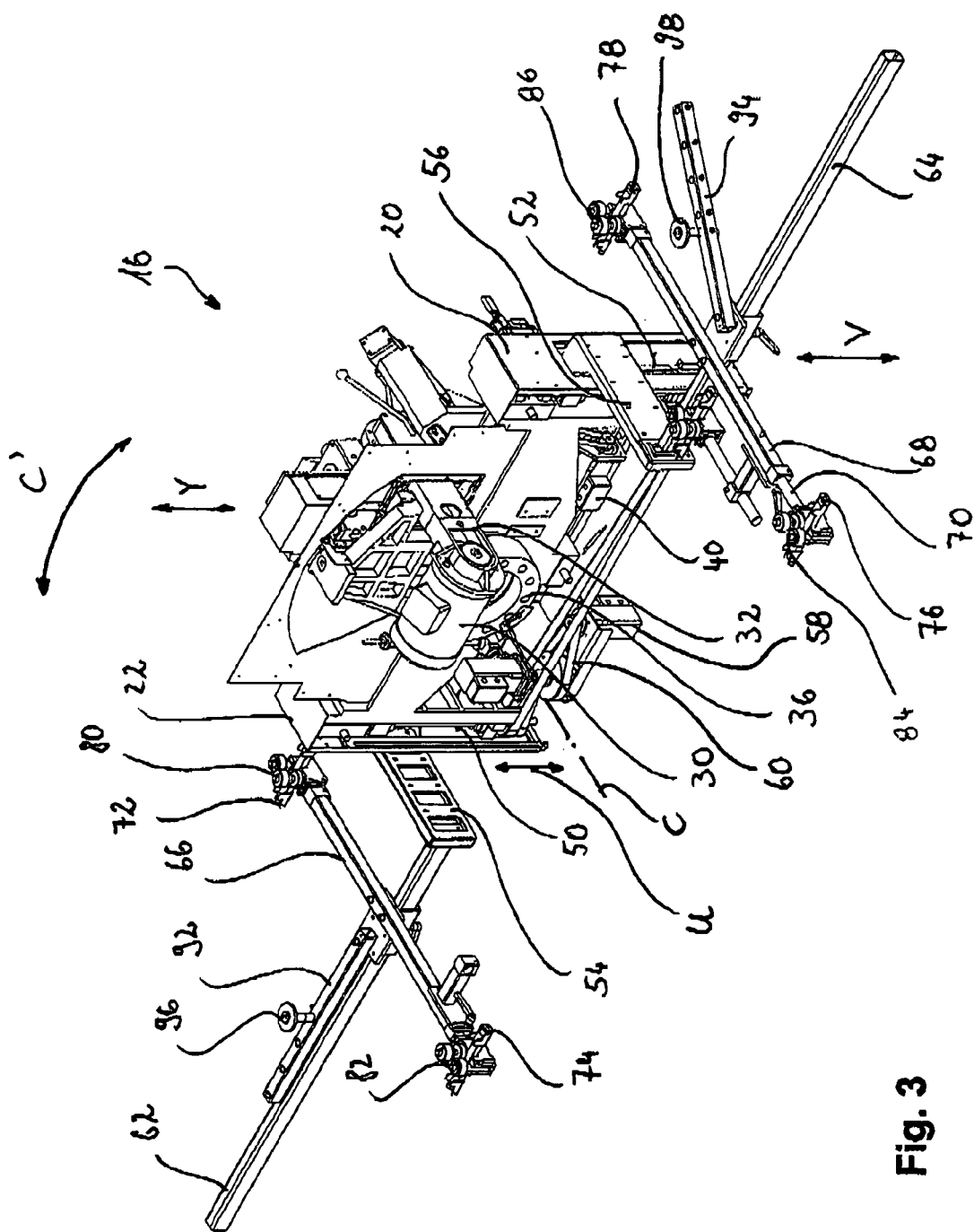
FIG. 3 shows a rear view of the machine components shown in FIG. 2.

FIGS. 2 and 3 show that the functional block 16 can be preassembled in the manner shown, so that all the machine components cooperating during the machining of the bandsaw blade 14, such as, for example, machining device 26, feed device 38, workpiece-fixing device 42 and a guiding device formed by the carrying arms 54, 56, the cantilevers 62, 64 and the components attached thereto, are mounted on the central machine block 18. As a result, the functional block 16 providing all the functionalities for machining the bandsaw blade 14 can be preassembled and undergo various functional tests outside a finally assembled machine, during which all the components of the functional block 16 are easily accessible for assembly, adjusting and maintenance purposes.

As soon as the functional block 16 has been preassembled and the individual components have been adjusted relative to one another and are fully functional, the functional block 16 can be attached to a machine stand 100 shown in FIG. 5. The machine stand 100 has a massive base 102, 104, by which it is supported on a foundation, and extends from the base substantially vertically upwards. It has a supporting rail 106, on which the ready-assembled functional block 16 can be seated and subsequently screwed to the body 108. The body 108 is of portal-like construction and has an opening 110 which also allows access to rear-side components, according to FIG. 3, when the machine is assembled.

For further assembly of the machine, a front guard 112 is attached to the machine stand 100, the front guard 112 having an immovable lower part 114 and an upper part 116 displaceable relative to the lower part 114 along an axis Z.

Furthermore, the housing has, in accordance with FIG. 4, a protective cover 118, which is likewise mounted on the body 108 and which is provided with a flap 120 with a viewing window 122. The flap 120 can be swung up in accordance with the arrow P in order thus to gain access to the functional block 16 even when the machine is assembled in accordance with FIG. 1. In order to improve this access further, the upper part of the front guard 112 can also be pushed downwards in accordance with the arrow Z for maintenance, setting or testing purposes.

The invention claimed is:

1. Machine (10) for machining an elongate workpiece (14) provided with cutting teeth (12) arranged along the elongate workpiece with the teeth including a cutting tooth with a tooth tip, in particular for grinding bandsaw blades, comprising:
a machining device (26),
a feed device (38),
a workpiece-fixing device (42) and
a workpiece-guiding device,
the workpiece-guiding device has a first guide and a second guide for slidably receiving the elongate workpiece which is a continuous saw blade, the machining device is located between the first guide and the second guide, the first guide includes multiple spaced apart first supports to support the saw blade, the second guide includes multiple spaced apart second supports to support the saw blade, the first supports are adjustably mounted to vary the spacing therebetween and the second supports are adjustably mounted to vary the spacing therebetween to cooperatively support at variable locations the entire length of the saw blade,
the machining device (26) having a tool (28), in particular a grinding wheel, which is rotationally drivable via a tool spindle about a tool spindle axis (A), for machining the workpiece (14), the rotationally drivable tool (28) being displaceable relative to the workpiece (14) by means of a multiaxis arrangement with axis guide,
wherein the feed device (38) has a feed head, which is displaceable along a feed axis (X) and by means of which the feed device positions the workpiece (14) in a desired position relative to the machining device (26),
wherein the workpiece-guiding device guides the workpiece (14) along a predetermined guide path to bring about the desired position by means of the feed device (38), and
the workpiece-fixing device (42) fixes the workpiece by clamping the workpiece on reaching the desired position,
characterised by a common central machine block (18), on which the machining device (26), the feed device (38), the workpiece-fixing device (42) and the workpiece-guiding device are mounted.

2. Machine (10) according to claim 1,
characterised in that the multiaxis arrangement of the machining device (26) has an axis guide for moving the rotationally drivable tool (28), in particular a grinding wheel, along a travel axis (Y) substantially orthogonal to the longitudinal extent of the workpiece (14) in the desired position.

3. Machine (10) according to claim 1, characterised in that the multiaxis arrangement of the machining device (26) has a pivoting mechanism for pivoting the rotationally drivable tool (28), in particular the grinding wheel, about a pivot axis (C) substantially orthogonal to the travel axis (Y) and to the longitudinal extent of the workpiece (14) in the desired position.

4. Machine (10) according to claim 3,
characterised in that the pivot axis (C) runs through a geometrical point (G) defined by the tooth tip of a cutting tooth, being machined.

5. Machine (10) according to claim 1,
characterised in that the workpiece-guiding device has carrying arms (54, 56) extending from the central machine block (18).

6. Machine (10) according to claim 1,
characterised in that the central machine block (18) is produced from a cast material.

7. Machine (10) according to claim 1,
characterised by machine housing, having a machine stand (100) which receives the central machine block (18), a front guard (112) which covers the machine stand (100), and a protective cover (118) which allows access to the machining device (26).

8. Machine (10) for machining an elongate workpiece (14) provided with cutting teeth (12) arranged along the elongate workpiece with the teeth including a cutting tooth with a tooth tip, in particular for grinding bandsaw blades, comprising:
a machining device (26),
a feed device (38),
a workpiece-fixing device (42) and
a workpiece-guiding device,
the machining device (26) having a tool (28), in particular a grinding wheel, which is rotationally drivable via a tool spindle about a tool spindle axis (A), for machining the workpiece (14), the rotationally drivable tool (28) being displaceable relative to the workpiece (14) by means of a multiaxis arrangement with axis guide,
wherein the feed device (38) has a feed head, which is displaceable along a feed axis (X) and by means of which the feed device positions the workpiece (14) in a desired position relative to the machining device (26),
wherein the workpiece-guiding device guides the workpiece (14) along a predetermined guide path to bring about the desired position by means of the feed device (38), and the workpiece-fixing device (42) fixes the workpiece by clamping the workpiece on reaching the desired position, characterised by a common central machine block (18), on which the machining device (26), the feed device (38), the workpiece-fixing device (42) and the workpiece-guiding device are mounted, and wherein:

the workpiece-guiding device has carrying arms arms (54, 56) extending from the central machine block (18), and characterised in that the carrying arms (54, 56) are attached in a positionally variable manner to the central machine block (18) via axis guides (50, 52), the axis guides (50, 52) guiding the carrying arms (54, 56) each in a direction substantially orthogonal to the longitudinal extent of the workpiece (14) in the desired position.

9. Machine (10) for machining an elongate workpiece (14) provided with cutting teeth (12) arranged along the elongate workpiece with the teeth including a cutting tooth with a tooth tip, in particular for grinding bandsaw blades, comprising:

a machining device (26),
a feed device (38),
a workpiece-fixing device (42) and
a workpiece-guiding device, the machining device (26) having a tool (28), in particular a grinding wheel, which is rotationally drivable via a tool spindle about a tool spindle axis (A), for machining the workpiece (14), the rotationally drivable tool (28) being displaceable relative to the workpiece (14) by means of a multiaxis arrangement with axis guide, wherein the feed device (38) has a feed head, which is displaceable along a feed axis (X) and by means of which the feed device positions the workpiece (14) in a desired position relative to the machining device (26), wherein the workpiece-guiding device guides the workpiece (14) along a predetermined guide path to bring about the desired position by means of the feed device (38), and the workpiece-fixing device (42) fixes the workpiece by clamping the workpiece on reaching the desired position, characterised by a common central machine block (18), on which the machining device (26), the feed device (38), the workpiece-fixing device (42) and the workpiece-guiding device are mounted, and wherein:

the workpiece-guiding device has carrying arms (54,56) extending from the central machine block (18), and characterised in that there are attached to the carrying arms (54, 56) transverse carriers (66, 68), with protruding ends which carry guide rests (72, 74,76, 78) in the region of the protruding ends.

10. Machine (10) for machining an elongate workpiece (14) provided with cutting teeth (12) arranged along the elongate workpiece with the teeth including a cutting tooth with a tooth tip, in particular for grinding bandsaw blades, comprising:

a machining device (26),
a feed device (38),
a workpiece-fixing device (42) and
a workpiece-guiding device, the machining device (26) having a tool (28), in particular a grinding wheel, which is rotationally drivable via a tool spindle about a tool spindle axis (A), for machining the workpiece (14), the rotationally drivable tool (28) being displaceable relative to the workpiece (14) by means of a multiaxis arrangement with axis guide, wherein the feed device (38) has a feed head, which is displaceable along a feed axis (X) and by means of which the feed device positions the workpiece (14) in a desired position relative to the machining device (26), wherein the workpiece-guiding device guides the workpiece (14) along a predetermined guide path to bring about the desired position by means of the feed device (38), and the workpiece-fixing device (42) fixes the workpiece by clamping the workpiece on reaching the desired position, characterised by a common central machine block (18), on which the machining device (26), the feed device (38), the workpiece-fixing device (42) and the workpiece-guiding device are mounted, and wherein:

characterised in that the central machine block (18) is designed with two vertical supports, which are connected to one another via a transverse-bracing arrangement (24), the workpiece-guiding device has carrying arms, the carrying arms (54, 56) being mounted on the vertical supports and the machining device (26), the feed device (38) and the workpiece-fixing device (42) being supported on the transverse-bracing arrangement (24).

* * * * *